United States Patent
Frauenthal et al.

(10) Patent No.: US 8,126,160 B2
(45) Date of Patent: Feb. 28, 2012

(54) USE OF NON-AUDIBLE BAND TO RELAY INFORMATION FOR ECHO CANCELLATION IN A DISTRIBUTED MEDIA SYSTEM

(75) Inventors: James C. Frauenthal, Colts Neck, NJ (US); Ramanathan Jagadeesan, San Jose, CA (US); Michael A. Ramalho, Sarasota, FL (US)

(73) Assignee: Cisco Technology, Inc., San Jose, CA (US)

( * ) Notice: Subject to any disclaimer, the term of this patent is extended or adjusted under 35 U.S.C. 154(b) by 771 days.

(21) Appl. No.: 12/235,179

(22) Filed: Sep. 22, 2008

(65) Prior Publication Data
US 2010/0074455 A1    Mar. 25, 2010

(51) Int. Cl.
*H04B 15/00* (2006.01)
(52) U.S. Cl. ......................... 381/94.1; 381/92
(58) Field of Classification Search .................. 381/94.1, 381/92
See application file for complete search history.

(56) References Cited

U.S. PATENT DOCUMENTS

| | | | | |
|---|---|---|---|---|
| 4,796,287 A | * | 1/1989 | Reesor et al. | 379/390.03 |
| 2005/0286698 A1 | * | 12/2005 | Bathurst et al. | 379/202.01 |
| 2006/0188089 A1 | * | 8/2006 | Diethorn et al. | 379/406.01 |
| 2009/0150149 A1 | * | 6/2009 | Culter et al. | 704/246 |

OTHER PUBLICATIONS

Toon Van Waterschoot, et al., "Double-Talk Robust Acoustic Echo Cancellation With Continuous Near-End Activity", 4 pages, ESAT-SCD, Katholieke Universiteit Leuven Kasteelpark Arenberg 10, B-3001 Leuven, Belgium.

* cited by examiner

*Primary Examiner* — Long Pham
(74) *Attorney, Agent, or Firm* — Fish & Richardson P.C.

(57) ABSTRACT

Particular embodiments provide for attenuating one or more microphone signals in a teleconferencing system upon detecting a non-audible signal. A far end voice signal is received from a sound source. A non-audible signal is added to the far end voice signal to create a composite signal, which is provided to one or more speakers. The speakers output the composite signal and the non-audible signal are detected in the composite signal after the composite signal is received at one or more microphones. The non-audible signal allows an attenuator to attenuate a microphone signal including the composite signal from a particular microphone in response to the detected non-audible signal to reduce far end echo.

11 Claims, 5 Drawing Sheets

USE OF NON-AUDIBLE BAND TO RELAY INFORMATION FOR ECHO CANCELLATION IN A DISTRIBUTED MEDIA SYSTEM

TECHNICAL FIELD

The present disclosure relates generally to audio processing and more specifically to echo cancellation in teleconferencing systems.

BACKGROUND

Echo cancellation is an important feature in voice communication systems, and in other types of teleconference systems that include voice, such as videoconferencing, Internet Protocol (IP) media transfer, or other types of media systems used for communications that include voice or audio. Two types of echo cancellation are typically classified as network-based or acoustic-based. In some cases echo cancellers do not function effectively when confronted with acoustic echo. Acoustic echo occurs when a microphone hears the output of speakers and reproduces the output in a signal sent back to the far end. The quality of a conference being provided is degraded when acoustic echo is experienced.

DETAILED DESCRIPTION OF EMBODIMENTS

Overview

Particular embodiments provide for attenuating one or more microphone signals in a teleconferencing system upon detecting a non-audible signal. A far end voice signal is received from a sound source. A non-audible signal is added to the far end voice signal to create a composite signal, which is provided to one or more speakers. The speakers output the composite signal, and the non-audible signal is detected in the composite signal after the composite signal is received at one or more microphones. The non-audible signal allows an attenuator to attenuate a microphone signal including the composite signal from a particular microphone in response to the detected non-audible signal to reduce far end echo.

Description of Example Embodiments

Figure 1:
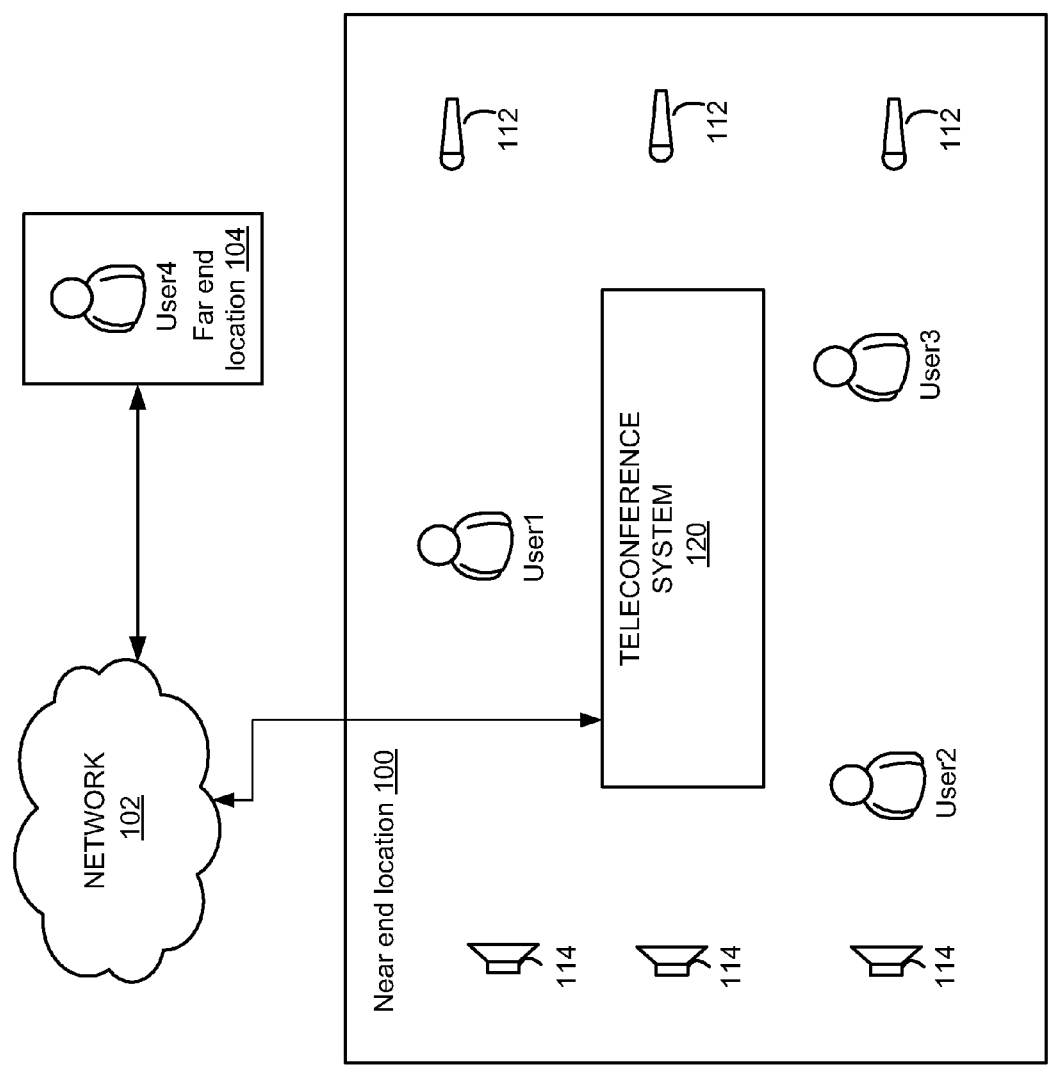
FIG. 1 depicts a system for using a non-audible signal to reduce echo according to one embodiment.

FIG. 1 depicts a system for using a non-audible signal to reduce echo according to one embodiment. A teleconference system 120 includes multiple microphones such as microphone 112 and speakers such as speaker 114 at a near end location 100. In general, a teleconference system can include additional or different types of components than may be discussed herein. For example, a teleconference system may include devices that process video, digital images, or other media. Microphones 112 can include any suitable type of audio transducer that can pick up audible sound. Similarly, speakers are representative of any type of transducer that can generate audible sound. Different types of technology, whether presently known or discovered in the future, can be used to implement features of a teleconferencing system that can be adapted for use with particular embodiments. Any number and type of microphones and speakers can be used and the placement in a room can vary. The correspondence, spacing or proximity of various microphones, speakers and human participants can be any predetermined or arbitrary arrangement.

In one embodiment, microphones 112 and speakers 114 are individually connected to a network 102 through a local area network (not shown). In one embodiment, microphones 112 and speakers 114 are distinct devices on network 102. For example, microphones 112 and speakers 114 are individually connected to a network 102, which may be a packet-based or cell-based network. Teleconference system 120 may be connected to other teleconference systems at other locations 104 through network 102. Location 104 may be referred to as the far end while location 100 may be considered the near end.

Acoustic echo may result when one or more microphones 112 hear the output of one or more speakers 114. Acoustic echo is different from network-based echo, which is echo that results from reflection of electric energy from circuits of telephony devices. For example, User4 may be located in far end location 104. When User4 speaks, audio is output from speakers 114. Microphones 112 may receive the audio signals and send them back to the far end location 104. The return of the audio spoken by User4 causes acoustic echo to occur.

Acoustic echo cancellers may be used to cancel acoustic echo. However, some networks may not include acoustic echo cancellers and thus the acoustic echo cannot be canceled. For example, some networks are not equipped with acoustic echo cancellers. Further, when external devices, such as handheld devices (cellular phones) or other telephony endpoints (speakerphone, IP telephone) are used, the type of echo canceller in those networks may be a network or hybrid echo canceller, which does not function effectively to cancel acoustic echo.

Also, even if an acoustic echo canceller is present, it may not be able to cancel the acoustic echo for various reasons. For example, the signal coming out of speakers 114 and coming into microphones 112 may not be precisely timed because microphones 112 and speakers 114 are distinct devices and communicate through a packet-based network. This may alter the timing that is used to cancel echo. For example, echo cancellation is achieved by injecting the negative of a calculated echo signal into the signal path received from microphone 112. The negative is injected at a time when it is expected that the echo will be received. Echo cancellation works best when signals are linear and time invariant (LTI), i.e., the timing of an echo signal can be calculated accurately such that its negative can be injected to cancel out the echo at the precise time. However, because of the nature of packet-based networks, timing of the echo signal is not precise, and thus accurate echo canceling cannot be achieved.

Particular embodiments output a non-audible signal or tone when audio signals are being output by speakers 114. The non-audible signal is received by microphones 112 and the sensitivity of the microphone is attenuated, i.e., the signal sent to the far end by the microphone is attenuated. The attenuation may occur in the microphone itself or in the network, such as at a component that aggregates the microphone signals and sends them to the far end. The attenuation may lower the sensitivity of microphones 112 such that a microphone signal that is sent to far end location 104 is reduced. This reduces the acoustic echo heard at the far end.

Figure 2:
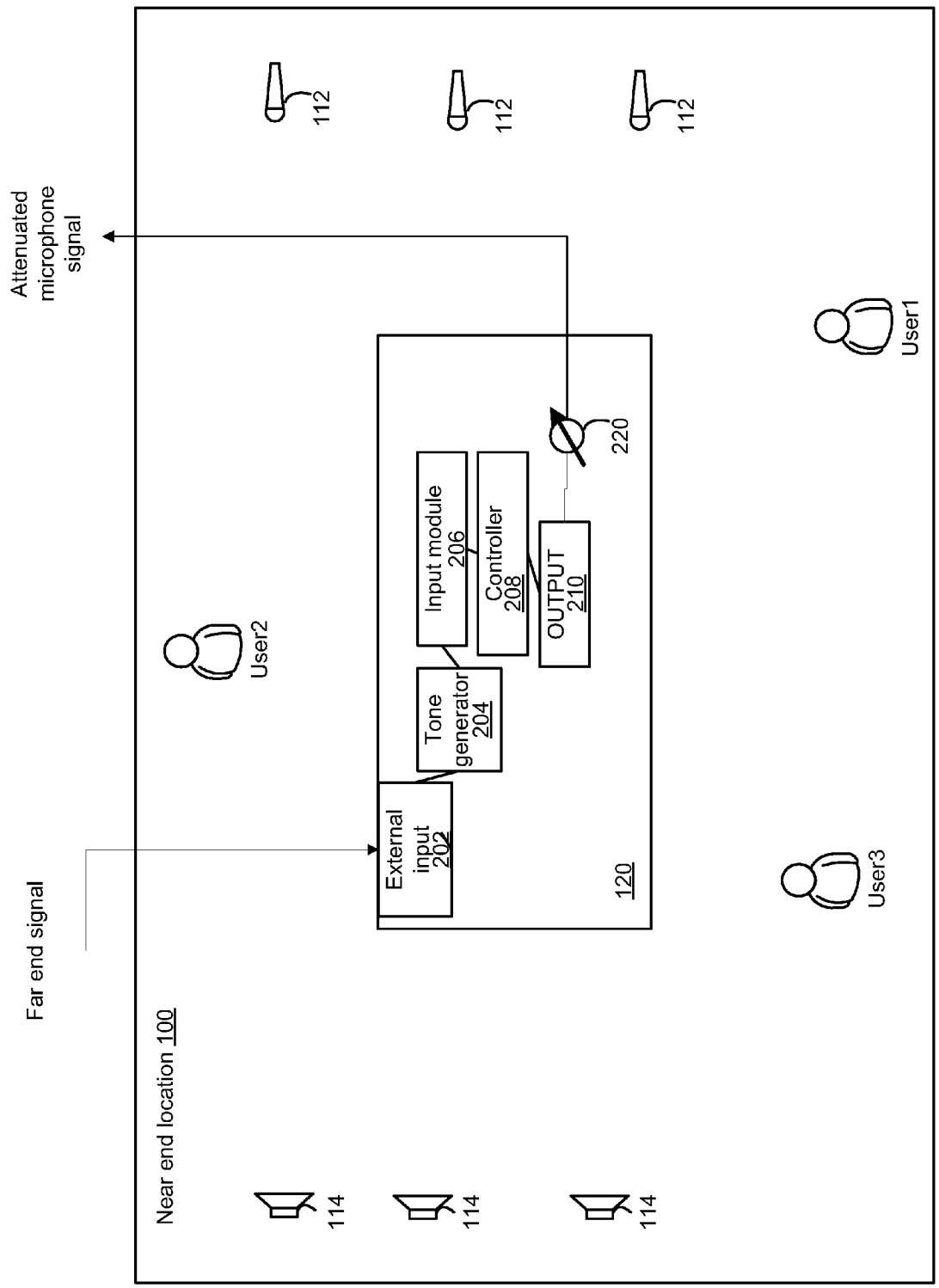
FIG. 2 is a simplified illustration of main components in a teleconferencing system to show basic operation of particular embodiments.

FIG. 2 is a simplified illustration of main components in a teleconferencing system to show basic operation of particular embodiments. In FIG. 2, User4 is speaking in the conference already in progress with other users, including Users 1-3 who are in location 100 and possibly other external users or locations (not shown) who are outside of the room. User4's voice signal is outputted by speakers 112. This is referred to as a "far end" signal since it is coming from outside of the room. Sounds originating from within the room (voice or other audio) are referred to as "near end" signals. Note that reference to a "voice" signal is intended to include a signal that can include any type of audio information, voice or otherwise, unless otherwise stated.

The signal relayed through network 102 to external input 202. The communication link can be wired or wireless. Near end sounds are also transferred across this link in order to send the near end audio to the far end listener. In different embodiments, these links to and from a relaying device can be the same or different links and any suitable communication mode can be used.

Incoming far end signals at the external input are provided to non-audible tone generator 204 where the far end voice signal is applied with a tone that is not audible to typical human hearing. For example, the tone may be substantially about 30-35 kilohertz which is a typical upper-limit for human hearing. In a particular embodiment the non-audible signal is a simple unvarying sinusoid tone. In other embodiments, other types of non-audible signals can be used. For example, a modulated non-audible frequency could be used to provide more information to the system, as described below.

Adding the non-audible signal to the voice signal results in a composite signal that includes both signals. The composite signal is transferred to input module 206. Input module 206 also receives inputs from microphones, such as microphone 112, in the room's teleconferencing system. Note that FIG. 2 is only an example illustration of one design for a controller. In other designs certain components or subsystems may be changed or omitted, and additional components may be employed. For example, an alternative system may not have an input stage that receives the relayed signal and the local microphone signals. Many variations are possible.

Inputs are provided to a controller 208. Controller 208 may include control logic that can selectively route different audio inputs to various speakers 114 in the room. For example, the composite signal including the non-audible signal is sent to speakers 114 and outputted.

Controller 208 is equipped to detect in-room, near end, speaking and to prevent such speaking from going to the speakers. However, the composite signal from the far end that is output at speakers 114 may be received at microphones 112. Since the composite signal includes the non-audible signal, an attenuator 220 that is responsive to the non-audible signal is used to reduce or eliminate a microphone signal from an associated microphone. Attenuator 220 may be found in microphone 112 or in other locations, such as in the network. In this manner, the far end voice signal that is played through speakers 114 may not result in a large signal going back through the microphones and being heard by the far end user (i.e., User4 of FIG. 1). This reduces the echo that can be heard by the far end user because the loudness of the far end voice signal received by microphone 112 is reduced, which reduces the loudness of the echo, if any exists.

When no one is speaking in location 100, the microphone signal may be fully attenuated as audio from location 100 does not need to be sent to far end location 104. However, when Users1-3 are speaking (or audio from other sources (recorded audio from MP3's, DVDs, presentations, etc.) needs to be sent to the far end), a "doubletalk" situation occurs where there are people talking at both the far and near ends at the same time. In this situation, the near end speech still needs to be sent to the far end. Thus, a microphone signal that is received from microphone 112 cannot be fully attenuated because the near end speech is attenuated in addition to any acoustic echo, which would not allow the far end user to hear the near end speaker. However, attenuator 220 can still reduce their input levels to a degree that reduces echo but also allows the far end listener to hear the near end audio. The amount of attenuation is set to be large enough so that acoustic echo is reduced to a tolerable state or existing echo cancellers can eliminate feedback of the far end talker without compromising the ability to have simultaneous two-direction speech.

In the absence of far end speech, but with the near end users speaking or not speaking, the non-audible signal is not present. The sensitivity of microphones 112 are set to their nominal level of sensitivity (i.e., no attenuation is performed). Echo cancellation is not performed because there is no signal from the far end that can be echoed.

Different embodiments can place attenuator 220 at different points in the input path. For example, rather than having the non-audible detection and/or attenuation at the same location as the microphone, the circuits can be included in pre-amplification circuitry that is near a microphone, at a point in the signal path from a microphone to the controller, at the input to the controller, internal to the controller, in the network, etc. The detection and attenuation can be carried out by a separate external device, not shown. In general, functionality described herein may be performed in different locations or by one or more different circuits or processing devices. For example, the non-audible signal can be added to the speaker output signal at different places other than at the tone generator 204 location as shown in the embodiment illustrated in FIG. 2. The tone signal can be added at output stage 210, or at a different point in the speaker signal paths, at the speakers themselves, etc.

Additional information can be used to enhance the performance of the system. For example, the microphone signal attenuation can vary among the microphones according to the proximity of a microphone to one or more speakers. A microphone that is close to a speaker may be attenuated more while a microphone that is farther from a speaker can be attenuated less. This may allow doubletalk situations to result in a clearer signal of the near end speaker's voice to the far end speaker/listener. The non-audible signal may also include an indication of the strength of the far end voice signal, the strength allowing attenuator 220 to determine a level of attenuation of the microphone signal. For example, a louder far end voice signal may result in more attenuation. Different tones can be used to selectively control different microphones' attenuations. Or modulation of non-audible signals (e.g., frequency modulation and amplitude modulation) may be used to convey such information.

Figure 3A:
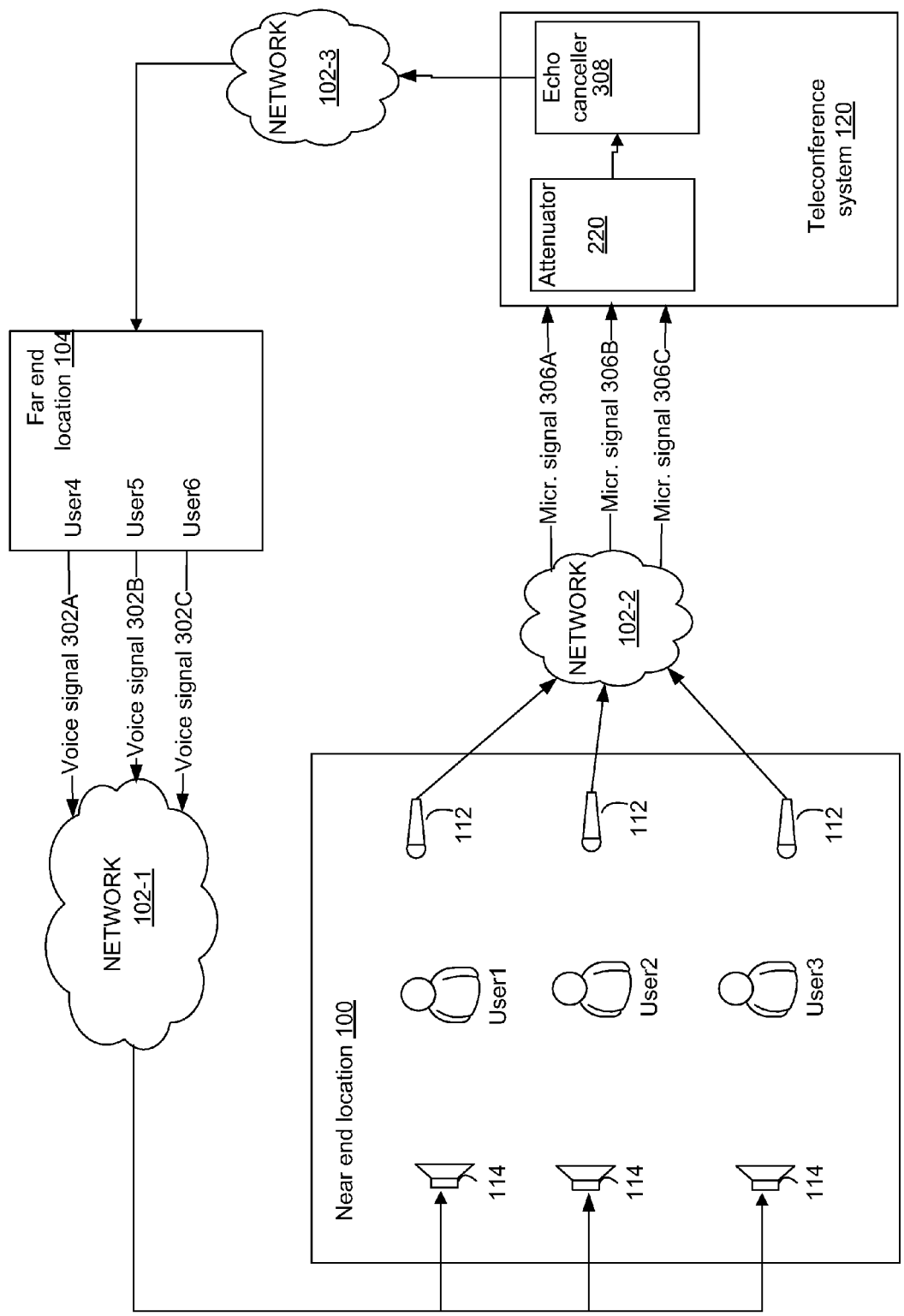
FIGS. 3A and 3B illustrate the use of a non-audible signal when echo cancellation is present (FIG. 3A) and when it is not present (FIG. 3B) according to one embodiment.
Figure 3B:
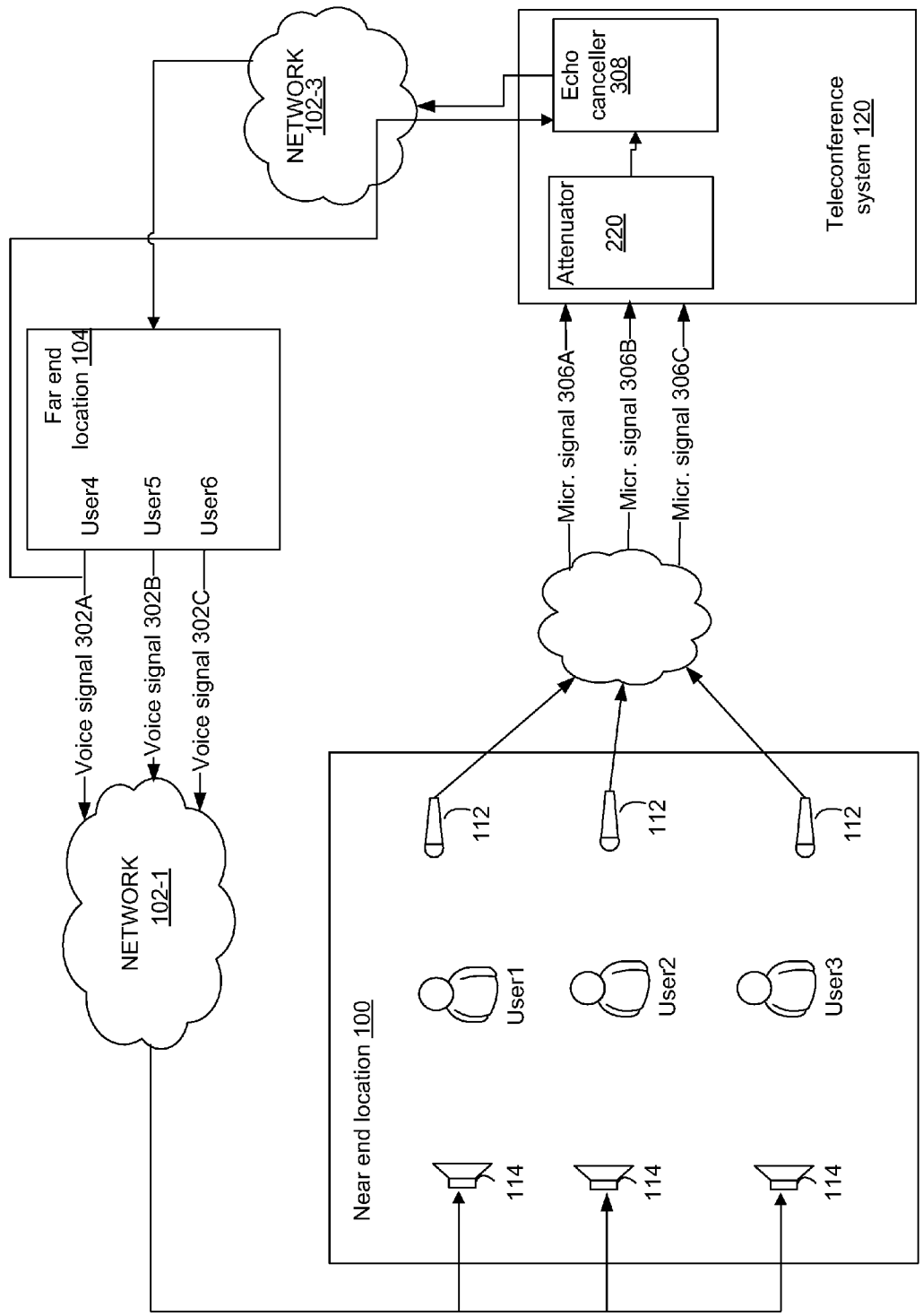

FIGS. 3A and 3B illustrate the use of a non-audible signal when echo cancellation is present (FIG. 3A) and when it is not present (FIG. 3B) according to one embodiment. FIG. 3A shows three audio sources, Users 4-6 that are found in a far end location 104. Although users are shown, it will be understood that any audio sources may be used, such as pre-recorded audio. Users 1-3 are found in near end location 100. Users 4-6 may speak and voice signals 302A, 302B, and 302C are sent through network 102-1 and output at speakers 114. A non-audible signal is added to the voice signals and is picked up by microphones 112.

The microphone streams (306A, 306B, and 306C) from microphones 112 are sent through network 102-2 to teleconference system 120, which may be located in near end location 102 or in the network. It should be noted that network 102-1 and network 102-2 may be different networks or the same network.

Attenuator 220 detects the non-audible signal in the voice signals 306A, 306B, and 306C and attenuates the loudness of the signals. Although attenuator 220 is shown in teleconference system 120, it will be understood it may be located in other locations, such as in microphones 112.

An echo canceller 308 may also be present and receives the attenuated signal. Echo canceller 308 may cancel network or hybrid echo. However, for reasons discussed above, echo canceller 308 may not be able to cancel any acoustic echo. For example, a system may not be configured to send voice signals 302A, 302B, and 302C to echo canceller 308 and thus it cannot inject the negative into microphone signals 306A, 306B, and 306C. An echo canceller needs to receive the voice signals to calculate the negative of any echo that might occur into the microphone signal to remove acoustic echo. Acoustic echo cancellation is not provided, but acoustic echo is reduced by attenuating the microphone signal in response to detecting the non-audible signal. The attenuated microphone signal is then sent to far end location 104 through network 102-3, which may be the same or different from networks 102-1 and/or 102-2.

FIG. 3B shows the same scenario as FIG. 3A but echo cancellation is available. For example, a voice signal 302A is received for user 302A. It may be assumed that there is accurate timing information for voice signal 302A and thus it can be effectively canceled. In this case, the non-audible signal is added to voice signals 302B and 302C when either of them is outputted from speakers 114. However, a non-audible signal is not added to voice signal 302A because it is assumed accurate acoustic echo cancellation can be performed. The non-audible signal may be selectively added to voice signals by determining an identifier associated with a voice signal 302A. If the identifier indicates that this voice signal has echo cancellation available, then the non-audible signal may not be added.

The microphone signals (306A, 306B, and 306C) from microphones 112 are sent through network 102-2 to teleconference system 120. When microphone signals include the non-audible signal, attenuator 220 detects the non-audible signal and attenuates the loudness of the signals. When users 5 and 6 speak without user 4, microphone signals 306 are attenuated. However, when only user 4 speaks, there is accurate timing information that can be used to cancel the echo for user 4. The tone may be added but if accurate echo cancellation is possible, the microphone is not attenuated. Also, in another embodiment, the non-audible tone is not added when only user 4 speaks, but is added when user5 and user6 speak.

Echo canceller 308 receives voice signal 302A and injects the negative into microphone signals 306A, 306B, and 306C at a time when acoustic echo is encountered. This reduces the echo heard at the far end. However, as discussed above, network 102-2 may be a packet-based network. This may cause the timing of the microphone signals to vary. The imprecise timing of microphone signals received at echo canceller 308 may cause the echo cancellation to not function correctly. For example, the negative that is injected into the microphone signal by a convolution processor may not cancel the echo accurately because it is injected at the wrong time. In this case, it may be desirable to attenuate microphone signals 306 for user 4 also to reduce the acoustic echo.

When the attenuation of microphone signals is performed, it should be noted that this attenuation may different from any attenuation performed by the echo canceller. For example, an echo canceller may have a convolution processor that injects the negative of the echo signal. The convolution processor may not be able to cancel the non-linear and time-variant signals. Accordingly, a non-linear processor (NLP) may be used to further reduce or eliminate echo signals that are non-linear and time-variant. While the convolution processor analyzes the signals to inject the inverse removing the echo, the non-linear processor, which may act as a center clipper, attenuates any signals within a certain range when it is enabled. Any signals that are not canceled by the convolution processor may be attenuated by the non-linear processor when it is enabled. Attenuator 220 may be positioned before the echo canceller and thus any echo that needs to be removed is reduced before it is received by the echo canceller. Also, there are times when the non-linear processor needs to be disabled, such as when a doubletalk condition occurs when multiple users speak at the same time. In this case, the echo cancellers experiencing the double-talk condition operate differently. For example, during double-talk, the non-linear processor experiencing double-talk is disabled from the transmission path. The non-linear processor is disabled because it otherwise would attenuate all signals. The attenuation of the microphone signals based on the non-audible signal provides a way to reduce acoustic echo without regard to the functioning of the echo cancellation. That is, if the non-linear processor is disabled because of doubletalk, the acoustic echo may still be reduced by attenuator 220. Also, in other embodiments, the non-linear processor may be made responsive to the non-audible tone and can be used as attenuator 220. In this case, during doubletalk, the non-linear processor may not be fully disabled, but my attenuate some of the microphone signal in response to receiving the non-audible signal. Different levels of attenuation depending on whether there was just far-end speech being echoed (apply strong attenuation) or doubletalk (apply weak attenuation) may be applied.

Figure 4:
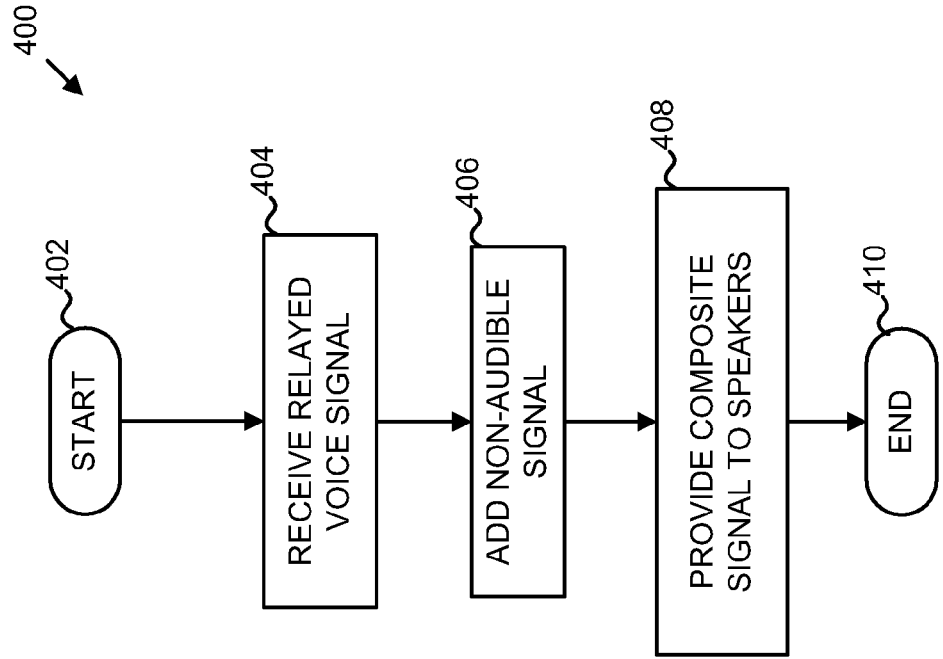
FIG. 4 is a flowchart of a routine for creating a composite signal.

FIG. 4 is a flowchart that illustrates basic steps in an example routine for adding a non-audible signal. In FIG. 4, flowchart 400 is entered at step 402. Step 404 is executed to receive the relayed signal. Step 406 is executed to add the non-audible signal to the relayed signal. Step 408 routes the resulting composite signal to one or more speakers. The routine is exited at step 410.

Figure 5:
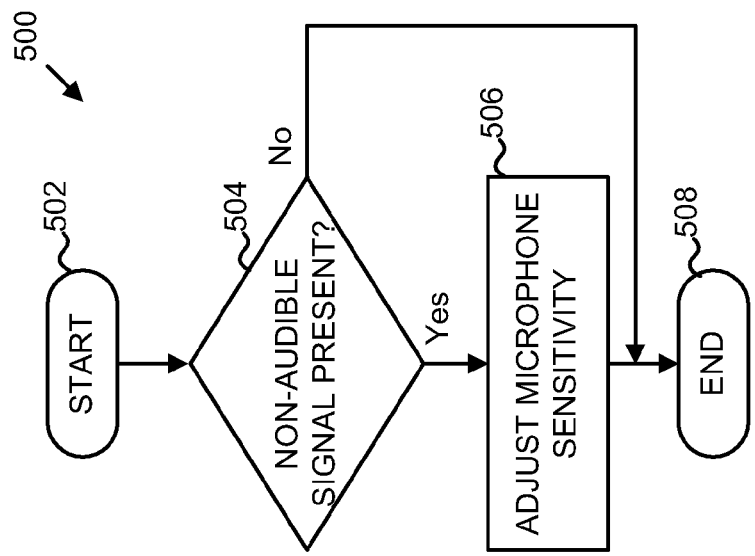
FIG. 5 is a flowchart of a routine for adjusting microphone sensitivity in response to a non-audible signal.

FIG. 5 is a flowchart that illustrates basic steps to attenuate a microphone. The routine of flowchart 500 is entered at 502 when a microphone receives an audio signal. Step 504 is executed to check whether a non-audible signal is present in the received audio signal. If not, execution exits at step 508. However, if the non-audible signal is present then step 506 is performed to attenuate the associated microphone's sensitivity.

Although the description has been described with respect to particular embodiments thereof, these particular embodiments are merely illustrative, and not restrictive. For example, other actions may be taken in response to detecting the non-audible tone such as complete muting of selected microphones and/or speakers, amplification of selected microphones and/or speakers, etc.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

The invention claimed is:

1. A method comprising:
receiving, at a first location, a far end voice signal from a sound source at a second location;
adding a non-audible signal to the far end voice signal to create a composite signal;
providing the composite signal to one or more speakers;
detecting the non-audible signal in the composite signal after the composite signal is received at one or more microphones after being output by the one or more speakers, the non-audible signal allowing an attenuator to attenuate a microphone signal including the composite signal from a particular microphone in response to the detected non-audible signal to reduce far end echo.

2. The method of claim 1, wherein the one or more microphones are located at the first location, wherein the sound source is located at the second location, the method further comprising:
determining that sound signals originating from the first location are below a threshold; and
attenuating microphone signals of one or more of the microphones if the non-audible signal is detected.

3. The method of claim 1, further comprising:
attenuating microphone signals of all of the microphones if the non-audible signal is detected.

4. The method of claim 1, further comprising:
detecting, in the microphone signal, the presence of the non-audible signal from the particular microphone simultaneously with the presence of a signal from the particular microphone; and
attenuating the microphone signal at all of the one or more of the microphones.

5. The method of claim 1, wherein attenuating comprises:
adjusting a particular microphone's sensitivity in response to the detected non-audible signal at the particular microphone.

6. The method of claim 1, further comprising:
receiving the far end voice signal, wherein the far end voice signal includes inaccurate timing.

7. The method of claim 6, wherein the inaccurate timing is due to the composite signal or microphone signal being sent through a packet-based network.

8. The method of claim 1, further comprising receiving a plurality of far end voice signals; and
selectively adding a non-audible signal to far end voice signals in the plurality of far end voice signals based on if acoustic echo cancellation is not available for the far end voice signals.

9. The method of claim 1, wherein attenuation of the microphone signal is performed in the microphone or in a network-based device.

10. The method of claim 1, wherein non-audible signal includes an indication of the strength of the far end voice signal, the strength allowing the attenuator to determine a level of attenuation of the microphone signal.

11. Software encoded in one or more computer-readable media for execution by the one or more processors and when executed operable to:
receive a relayed voice signal from a sound source via a relay device;
add a non-audible signal to the relayed voice signal to create a composite signal;
provide the composite signal to the speakers;
detect the non-audible signal in the composite signal after the composite signal is received at one or more of the microphones; and
adjust a particular microphone's sensitivity in response to the detected non-audible signal at the particular microphone.

* * * * *